United States Patent [19]

Gouverneur

[11] Patent Number: 4,786,759
[45] Date of Patent: Nov. 22, 1988

[54] ARTICULATED CABLE HEAD FOR SUBMARINE LINKS

[75] Inventor: Jean-Pierre Gouverneur, Calais, France

[73] Assignee: Les Cables De Lyon, Clochy, France

[21] Appl. No.: 120,260

[22] Filed: Nov. 12, 1987

[30] Foreign Application Priority Data

Nov. 14, 1986 [FR] France .................. 86 15875

[51] Int. Cl.$^4$ ............... H02G 15/14; H02G 15/007
[52] U.S. Cl. .................................. 174/70 S; 174/86; 403/57; 403/404; 464/181; 464/903
[58] Field of Search ................ 174/70 S, 86; 350/96.20; 403/57, 58, 74, 122, 404; 439/6, 8; 464/112, 125, 134, 181, 903

[56] References Cited

U.S. PATENT DOCUMENTS

| | | |
|---|---|---|
| 3,780,210 | 12/1973 | Rocton ..................... 174/70 S |
| 4,540,385 | 9/1985 | Krude ..................... 464/181 X |
| 4,568,314 | 2/1986 | Krude ..................... 464/181 |
| 4,601,536 | 7/1986 | Guazzo ................... 350/96.20 |
| 4,681,556 | 7/1987 | Palmer .................... 464/181 |

*Primary Examiner*—Laramie E. Askin
*Attorney, Agent, or Firm*—Sughrue, Mion, Zinn, Macpeak & Seas

[57] ABSTRACT

This articulated cable head includes a universal joint whose support (4) and ring (5) are made of fiber and epoxy resin laminates obtained by winding threads. The universal joint head (6) is spherical in shape and is made, together with an oscillating arm (7) which extends therefrom, as a single piece of cuproberyllium alloy. The oscillating arm (7) carries a tubular stop part (8) made of fiber and epoxy resin laminate obtained by winding threads, which is surrounded by a rubber sleeve (80, 81, 82) providing a transition in diameter, and which is hollowed out by a cavity serving as a housing for an anchor part (9) attached to the end of a line cable (2).

10 Claims, 1 Drawing Sheet

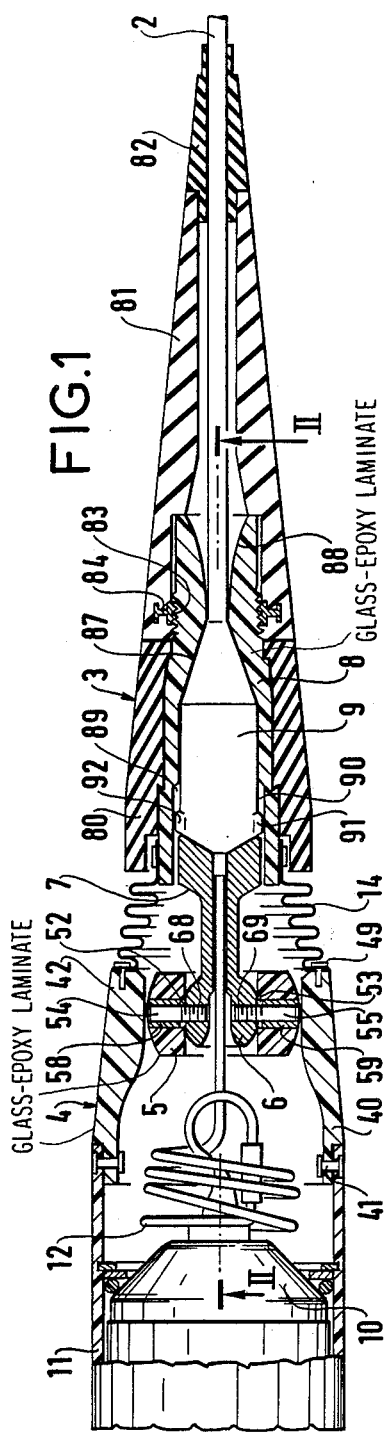

ARTICULATED CABLE HEAD FOR SUBMARINE LINKS

The present invention relates to mechanical junctions between the line cable and the equipment housings in a submarine link, and more particularly to mechanical junctions which include a universal joint in order to avoid applying bending forces to the line cable where it leaves the equipment housings, and such junctions are referred to as articulated cable heads.

BACKGROUND OF THE INVENTION

Such articulated cable heads, as shown in particular in U.S. Pat. No. 3,780,210 are essentially constituted by a universal joint support which is fixed to one end of an equipment housing, a universal joint head which is extended by an oscillating arm which is fixed to a stop part enclosing an anchor part attached to one end of the line cable, and a universal joint ring which is hinged both to the support and to the head of the universal joint. These various parts which must be of high mechanical quality, as must the equipment housings, are made of a special cuproberyllium alloy which is chosen for its excellent resistance to sea water.

This alloy is expensive because it is little used. Thus attempts have already been made to eliminate it from the housings by making the housings, as described in the above-mentioned patent, in the form of a steel case which is placed inside a tubular shell which is fixed to the articulated cable heads. The steel case withstands the pressure of the surrounding medium; it is waterproof, very rigid and is coated with a sheath of polyethylene which protects it from sea water. The tubular shell is made of a glass-epoxy laminate and withstands the traction forces exerted by the line cable; it comprises a cylinder which is closed by two hollow hemispheres each having a circular opening in the middle thereof with the base of a universal joint support for an articulated head being fixed to the perimeter of said opening.

The universal joint support is still made of cuproberyllium alloy, as are the main parts of the articulated head, namely the universal joint ring and head, and the stop part.

Preferred embodiments of the present invention provide an articulated head at reduced cost, which additionally makes it possible to simplify the shell of an equipment housing.

SUMMARY OF THE INVENTION

The present invention provides an articulated cable head for submarine links, the head including a universal joint, wherein the support and the ring of the universal joint are made of a fiber and epoxy resin laminate by winding threads.

Advantageously, the articulated head includes a stop part which is fixed to the universal joint head and which encloses an anchor part which is attached to an end of the line cable and which is itself made of a fiber-resin laminate obtained by winding a thread.

The universal joint support may be in the form of a sleeve which is fixed directly on the cylindrical portion of an equipment housing.

BRIEF DESCRIPTION OF THE DRAWING

An embodiment of the invention is described by way of example with reference to the accompanying drawings, in which:

FIG. 1 is a section through an articulated cable head fixed to the end of a submarine repeater housing which is shown partially in section.

FIG. 2 is a further enlarged sectional view taken about lines II—II of FIG. 1.

MORE DETAILED DESCRIPTION

The general shape of a submarine repeater is that of a cylindrical cask which is extended at its two ends by articulated cable heads which connect it to a line cable. In the figures, the cylindrical cask is shown in part and comprises a metal case 10 placed inside a tubular shell 11.

The metal case 10 encloses the repeater equipment and protects it against the pressure of the surrounding medium. It is made of steel, it is watertight, very rigid, and coated with a polyethylene sheath which isolates it from sea water.

It is fitted at each end with a cable connection tail 12 giving access to its internal equipment and connecting it to the line cable 2 by passing through an articulated head 3.

The tubular shell 11 is in the form of a cylinder made of a glass-epoxy laminate which is very strong in traction and which provides the mechanical connection between the articulated cable heads.

The articulated head 3 comprises a universal joint support 4 fixed to one end of the shell 11. This support is made of a glass-epoxy resin laminate made from a cop of glass threads which are wound as crossed threads. It is in the form of a slightly tapering sleeve whose wall thickness is greater than the wall thickness of the shell 11 and increases going away from its large diameter end 40 (which is received in and fixed to the end of the shell 11 by means of a set of screws 41 and knurled nuts which are embedded and glued therein and which are made of a cuproberyllium alloy) towards its smaller diameter end 42 housing a universal joint ring 5. The bore of the universal joint support 4 is provided at its small diameter end 42 with two diametrically-opposite parallel flats having two facing hinge holes 43 and 44 drilled therein and serving as bearing surfaces for two stub axles 45 and 46 made of cuproberyllium alloy and about which the universal joint ring 5 is free to pivot. These hinge holes 43 and 44 are lined with guide bushings 47 and 48 which are made of cuproberyllium alloy and which are glued in place, thereby distributing the forces exerted by the stub axles 45 and 46 within the laminate and thus avoiding shear between the layers of threads.

The universal joint ring 5 is also made of a glass-epoxy laminate made from a cop of glass threads wound as crossed threads. Its thickness is substantially equal to the thickness of the outer wall at the small diameter end 42 of the universal joint support 4 in which it is received. Its outer surface is spherical and has two diametrically-opposite outer parallel flats with two facing hinge holes 50 and 51 drilled therethrough and serving as bearing surfaces for the stub axles 45 and 46 which connect it to the universal joint support 4. Its cylindrical bore has two diametrically-opposite inside parallel flats disposed at 90° to the outside flats and having two facing hinge holes 52 and 53 drilled therethrough which serve as bearing surfaces for two stub axles 54 and 55 made of cuproberyllium alloy and about which a universal joint head 6 pivots, which head is extended by an oscillating arm 7. The four hinge holes 50, 51, 52, and 53 are lined like the holes 43 and 44 of the support 4 by guide bushings 56, 57, 58, and 59 made of cuproberyllium alloy for distributing forces within the laminate. The bushings 56 and 57 are tapped, thereby enabling the stub axles to be screwed therein thus attaching the ring 5 to the support 4. Two notches 60 and 61 are milled in the sides of the ring 5 up to the rocking limits of the oscillating arm 7 in order to increase the angle through which the oscillating arm 7 can pivot relative to the universal joint ring 5 and thus preventing the stroke of the oscillating arm 7 from being limited in any direction other than by the circular opening to the universal joint support 4.

The universal joint head 6 is spherical in shape and is received in the bore of the ring 5. It has two diametrically-opposite parallel flats with two facing tapped hinge holes 68 and 69 drilled therethrough into which the stub axles 54 and 55 which attach it to the ring 5 are screwed. The head is made together with the oscillating arm 7 as a single piece of cuproberyllium alloy, and the head and the arm have an axial channel drilled therethrough into which the cable connection tail 12 penetrates after acquiring flexibility by initially following a corkscrew-shaped path.

The oscillating arm 7 is covered by a bellows 14 which is fixed at one end to the periphery of the universal joint support 4 by a set of screws 49 and at its other end to the end of the oscillating arm 7 furthest from the universal joint head 4 by means of screws 71 which screw into tapped lateral holes 72 and which also connect said end of the oscillating arm 7 to a tubular stop part 8 which engages thereover.

The tubular stop part 8 is made of glass and epoxy resin laminate from a cop of glass threads which are wound as crossed threads over a temporary mandrel having the same size as its central cavity. The outer profile of the stop part 8 is in the form of a succession of cylinders of decreasing diameter going away from the repeater housing and serves as a support for a three-part rubber sleeve 80, 81, and 82 which provides a progressive diameter transition between the shell 11 of the repeater housing and the line cable 2. This outer profile includes a threaded portion 83 for fastening the midportion 81 of the rubber sleeve by means of a tapped ring 84 made of cuproberyllium alloy and embedded in the rubber. The front portion 80 of the rubber sleeve placed adjacent the repeater housing fits snugly over the stop part 8 and is locked in place by shoulders 85 and 86 between the different diameter outer cylindrical surfaces of the stop part 8. It may be replaced if a longer stop part 8 is used. The rear portion 82 of the rubber sleeve is fixed to the mid-portion 81 by inter-fitting means and may be replaced for use with different diameter line cables.

The cavity in the stop part 8 begins, adjacent to the oscillating arm 7, with a cylindrical portion having two diametrically-opposite recesses 89 and 90 in its wall for anti-rotation splines 91 and 92 projecting from the side wall of an anchor part 9, and it terminates at its end furthest from the oscillating arm by a tapering portion in the form of a funnel 87 leading to a flared outlet 88. This cavity serves to receive the anchor part 9 which is complementary in shape and which is attached to the line cable 2 and which penetrates into the stop part 8 via its flared portion 88. This anchor part 9 comes into abutment against the funnel-shaped conical portion 87 of the stop part 8 and is prevented from rotating relative to the stop part 8 by means of its anti-rotation splines 91 and 92 projecting from its side wall. It is constituted by a waterproof metal box which is very rigid and inside which the cable connection tail 12 is connected to the line cable 2. This box is made of steel and is coated with a polyethylene sheath which isolates it from sea water. It is attached to the stranded strength member of the line cable 2 in conventional manner means of a conical ring splaying out the strands in a conical inlet.

The articulated cable head described above, in addition to being less expensive by virtue of using laminated parts, also simplifies the shell of the equipment housing by omitting its hemispherical parts.

I claim:

1. An articulated cable head for submarine links, the head having a universal joint including a universal joint head, a universal joint support and a ring, and wherein said support and said ring are made of a fiber and epoxy resin laminate by winding threads.

2. An articulated cable head according to claim 1, wherein the universal joint support is in the form of a sleeve having one end with a thick wall serving as a housing for the universal joint ring and serving as a hinge bearing surface about which said ring pivots, and having another end with a thin wall for fixing directly to a cylindrical portion of an equipment housing.

3. An articulated cable head according to claim 2, wherein said laminates have layers of fibers, the universal joint hinge bearing surfaces in the support and the ring of the universal joint are constituted by holes drilled in the laminates, said holes carrying axles, and said holes being lined with metal bushings of cuproberyllium alloy for distributing the forces exerted by the axles in the laminates and preventing shear between the layers of fibers.

4. An articulatd cable head according to claim 1, wherein said universal joint head is positioned within said ring and is extended by an oscillating arm projecting axially beyond the ring and wherein the universal joint ring includes two notches milled laterally to define rocking limits for the oscillating arm in order to open up the pivot angle of said oscillating arm relative to the universal joint ring so that its stroke is limited solely by an opening of the universal joint support.

5. An articulated cable head for submarine links, said cable head having a universal joint including a universal joint head, a support and a ring, said support and said ring being made of a fiber and epoxy resin laminate by winding thread, said cable head further including a stop part which is fixed to the universal joint head and which includes a cavity serving as a housing for an anchor part which is attached to an end of a line cable, and said stop part being made of fiber and epoxy resin laminate by winding threads.

6. An articulated cable head according to claim 5, which includes at least one recess in the inside wall of said cavity to receive an anti-rotation spline projecting from the surface of the anchor part.

7. An articulated cable head according to claim 5, said stop part fixed to the universal joint head having an outside profile in the form of a succession of cylinders of decreasing diameter in a direction away from the universal joint ring and supporting a three-part rubber sleeve providing a progressive diameter transition.

8. An articulated cable head according to claim 7, wherein the stop part is provided on the outer periphery thereof with a thread for fixing a mid-portion of the rubber sleeve, and said sleeve is provided with a threaded metal ring embedded in the rubber sleeve and in mesh with said thread of said stop part.

9. An articulated cable head according to claim 8, wherein the rubber sleeve has one end portion locked by means of the mid-portion against shoulders of an outside wall of the stop part, and another end portion interfitted with the mid-portion.

10. An articulatd cable head according to claim 5, wherein said stop part includes a cylindrical portion which opens out towards the universal joint head and is engaged over the end of an oscillating arm extending the universal joint head, screws carried by said cylindrical portion are threaded into the end of said arm, and said stop part terminates at an end furthest from the head in a funnel shaped tapering conical portion leading to a flared outlet for receiving a line cable.

* * * * *